United States Patent
Gill

(10) Patent No.: US 6,735,060 B2
(45) Date of Patent: May 11, 2004

(54) SPIN VALVE SENSOR WITH A METAL AND METAL OXIDE CAP LAYER STRUCTURE

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 09/886,832

(22) Filed: Jun. 20, 2001

(65) Prior Publication Data

US 2002/0196589 A1 Dec. 26, 2002

(51) Int. Cl.$^7$ ............................................... G11B 5/127
(52) U.S. Cl. .................................................... 360/324.1
(58) Field of Search ..................... 360/324.1, 324.12, 360/324, 324.11, 314, 317, 319; 324/252, 207.21

(56) References Cited

U.S. PATENT DOCUMENTS

| | | | |
|---|---|---|---|
| 5,465,185 A | 11/1995 | Heim et al. | |
| 5,998,016 A | 12/1999 | Sasaki et al. | 428/336 |
| 6,134,090 A | 10/2000 | Mayo et al. | 360/324.1 |
| 6,185,078 B1 * | 2/2001 | Lin et al. | 360/324.12 |
| 6,208,491 B1 * | 3/2001 | Pinarbasi | 360/324.1 |
| 6,262,869 B1 * | 7/2001 | Lin et al. | 360/324.11 |
| 6,268,985 B1 * | 7/2001 | Pinarbasi | 360/324.12 |
| 6,291,993 B1 * | 9/2001 | Fert et al. | 324/252 |
| 6,313,973 B1 * | 11/2001 | Fuke et al. | 360/324.1 |
| 6,338,899 B1 | 1/2002 | Fukuzawa et al. | 428/332 |
| 6,396,668 B1 * | 5/2002 | Mao et al. | 360/314 |
| 6,466,419 B1 * | 10/2002 | Mao | 360/324.12 |

FOREIGN PATENT DOCUMENTS

| | | |
|---|---|---|
| DK | 19652536 | 6/1997 |
| DK | 19720197 | 11/1998 |
| EP | 0845820 A2 | 6/1998 |
| EP | 0993054 A2 | 4/2000 |
| JP | 11008424 | 1/1999 |
| JP | 11097072 | 4/1999 |

OTHER PUBLICATIONS

*IEEE Transactions on Magnetics*, vol. 34/No. 4, Jul. 1998, "Time and Temperature Dependence of High Thermal Stability in NiO\Co\Cu\Co\M Spin Valves".

*Journal of Magnetism and Magnetic Materials* 154 (1996) 165–174, "X–ray and magnetoresistance measurements of annealed Co/Cu multilayers".

*IEEE Transactions on Magnetics*, vol. 36/ No. 5, Sep. 2000, "Effect of Thin Oxide Capping on Interlayer Coupling in Spin Valves", pp. 2629–2631.

*Intermag 2000 Digest of Technical Papers*, 2000 IEEE International Magnetics Conference, Apr. 9–13, 2000, "Enhancement of GMR Properties of Bottom Type Spin Valve Films with Ultra–Thin Free Layer Covered with Specular Oxide Capping Layer".

* cited by examiner

Primary Examiner—Allen Cao
(74) Attorney, Agent, or Firm—Ervin F. Johnston

(57) ABSTRACT

A cap layer structure is provided with a first layer composed of a metal and a second cap layer composed of a metal oxide. The first cap layer reflects conduction electrons back into the mean free path of conduction electrons and the second cap layer protects the first cap layer from subsequent processing steps without degrading the performance of the first cap layer.

17 Claims, 5 Drawing Sheets

(ABS)

SPIN VALVE SENSOR WITH A METAL AND METAL OXIDE CAP LAYER STRUCTURE

BACKGROUND OF THE INVENTION

1. Field of the Invention

The present invention relates to a spin valve sensor with a metal and metal oxide cap layer structure and, more particularly, to a cap layer structure which includes a gold or copper layer for specular reflection of conduction electrons and an aluminum oxide or tantalum oxide layer for protecting the gold or copper layer from degradation.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

As stated hereinabove, the spin valve sensor has a spin scattering region which is located between the aforementioned interfaces of the spacer layer with each of the pinned and free layer structures. Unfortunately, a portion of the conduction electrons escape from the spin scattering region which reduces the aforementioned magnetoresistive coefficient dr/R. A scheme for preventing escape of these conduction electrons from the spin-dependent region is to provide a specular reflector layer in a cap structure at the top of the spin valve sensor. The specular reflector layer reflects the conduction electrons back into the spin-dependent region so as to improve the magnetoresistive coefficient dr/R of the sensor. The specular reflector layer, which is a first cap layer of the cap structure, is located between and interfaces each of a free layer structure and a second cap layer. The second cap layer is employed for protecting the specular reflector layer from subsequent processing steps. Typically, the second cap layer has been tantalum (Ta). Unfortunately, tantalum degrades the gold of the specular reflector layer which degrades its performance as a specular reflector.

SUMMARY OF THE INVENTION

The present invention provides a cap layer structure which includes a first cap layer which is composed of a metal, such as gold or copper, for specular reflection and a second cap layer which is composed of a metal oxide, such as aluminum oxide or tantalum oxide. I have found that aluminum oxide or tantalum oxide is highly compatible with gold or copper and does not cause degradation thereof. In a preferred embodiment the free layer structure includes a first layer of cobalt iron and a second layer of nickel iron with the cobalt iron interfacing a copper spacer layer and the nickel iron layer interfacing the gold or copper layer. The gold or copper layer prevents an interfacing between the nickel iron layer and the aluminum oxide or tantalum oxide layer, as well as causing specular reflection of conduction electrons.

An object of the present invention is to provide a first cap layer which causes specular reflection of conduction electrons and a second cap layer which does not degrade the first cap layer while protecting the first cap layer from subsequent processing steps.

Another object is to provide a method for constructing the aforementioned spin valve sensor with the aforementioned cap layer structure.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
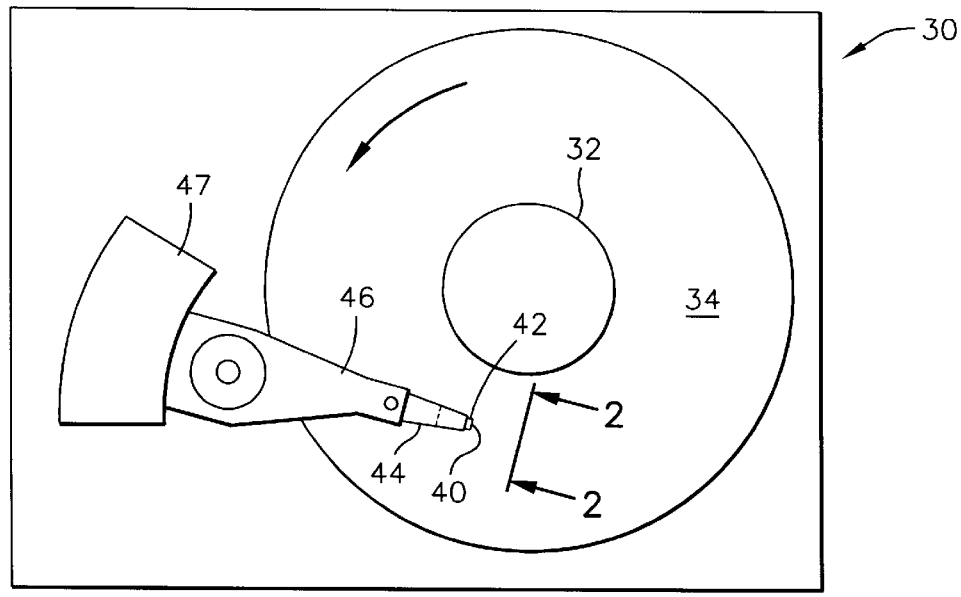
FIG. 1 is a plan view of an exemplary magnetic disk drive.
Figure 2:
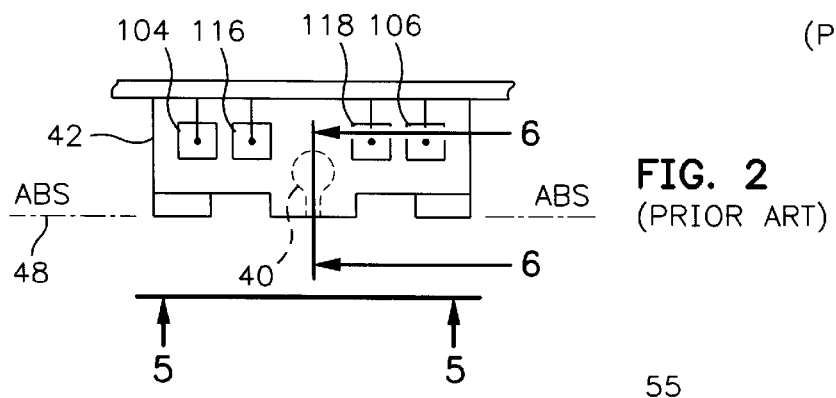
FIG. 2 is an end view of a slider with a magnetic head of the disk drive as seen in plane 2—2 of FIG. 1.
Figure 3:
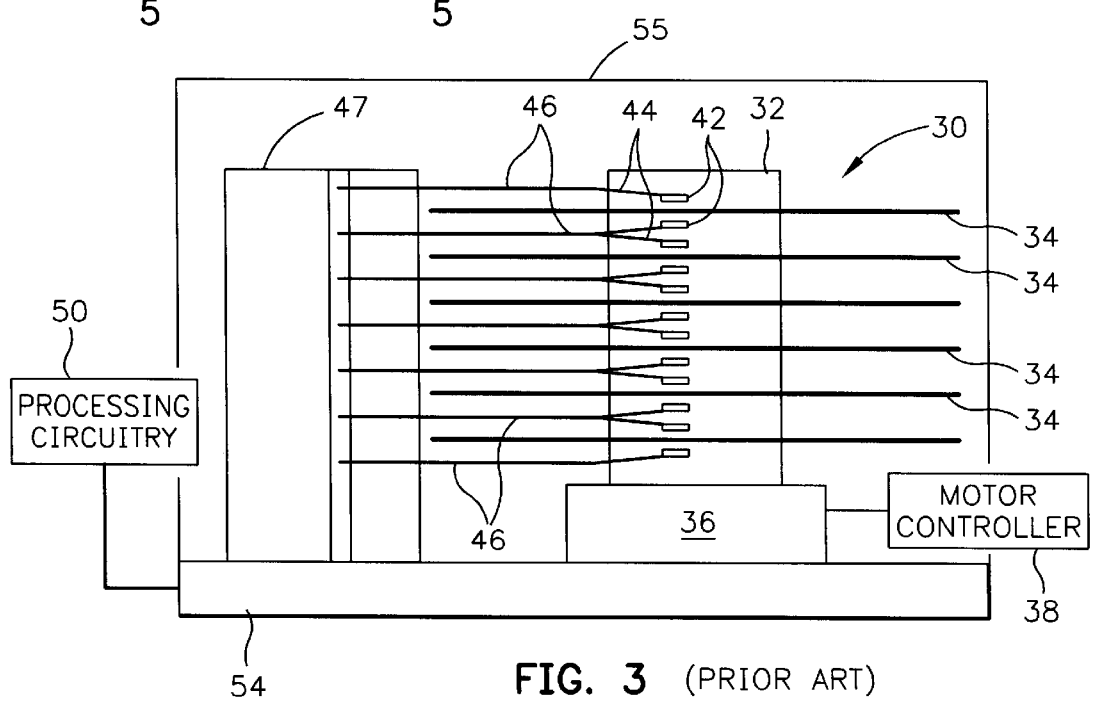
FIG. 3 is an elevation view of the magnetic disk drive wherein multiple disks and magnetic heads are employed.
Figure 4:
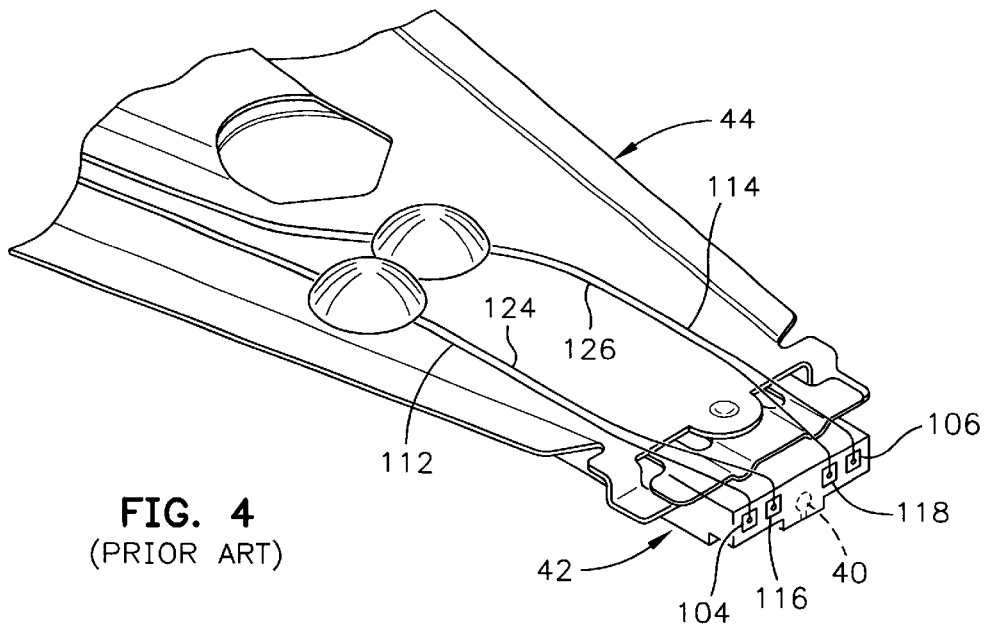
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
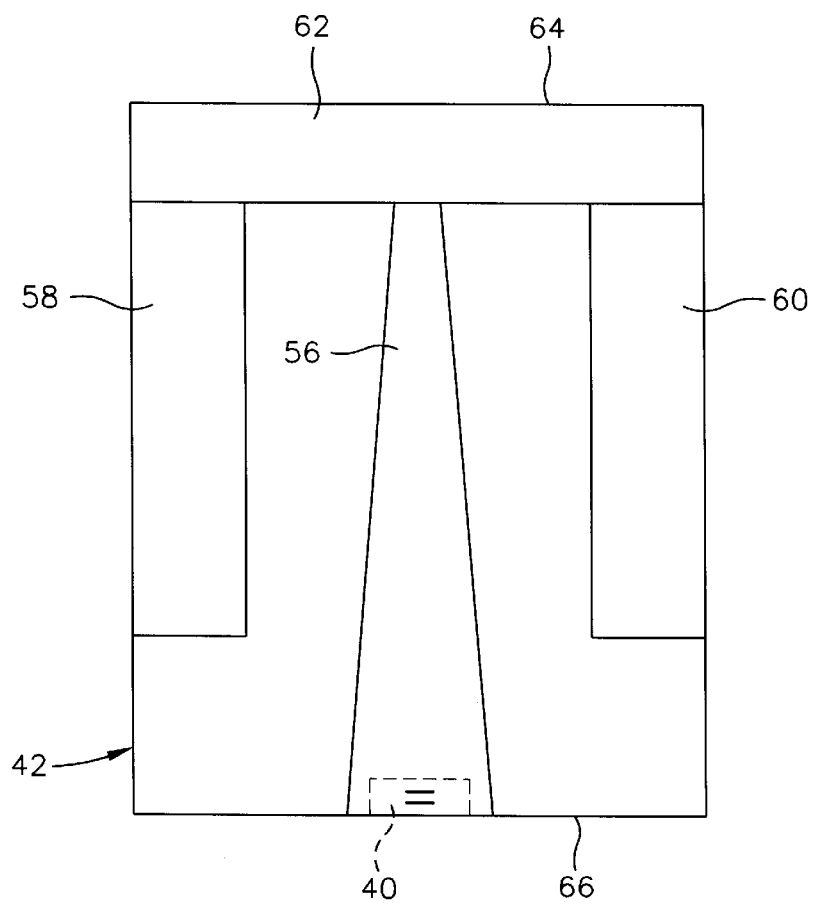
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
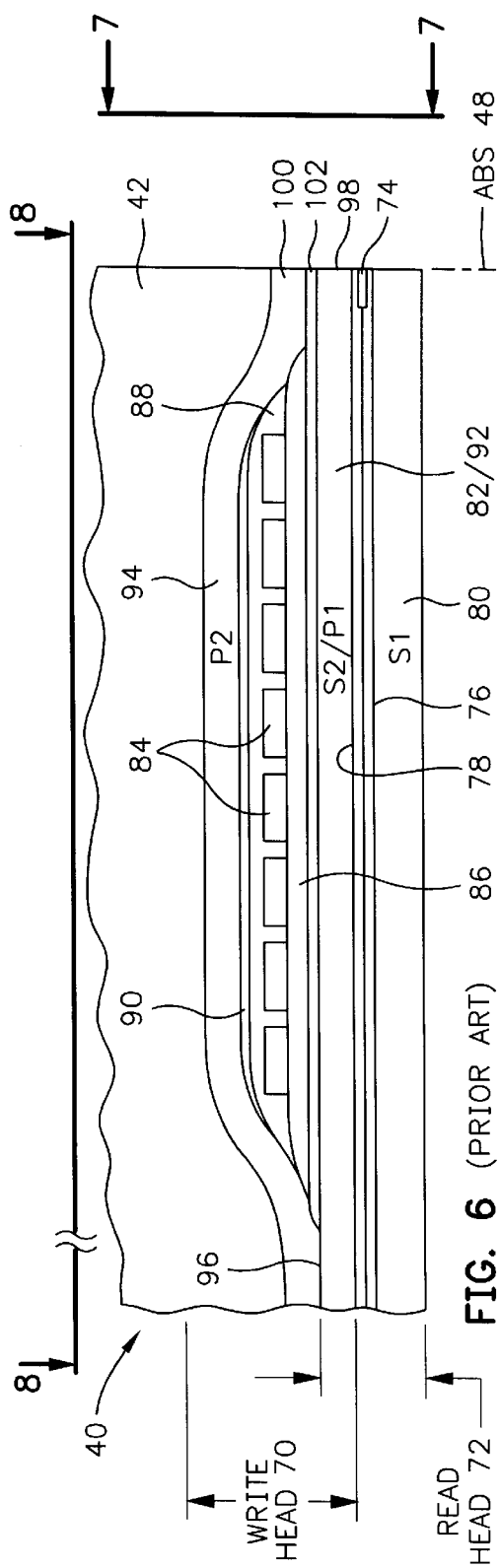
FIG. 6 is a partial view of the slider and a merged magnetic head as seen in plane 6—6 of FIG. 2.
Figure 7:
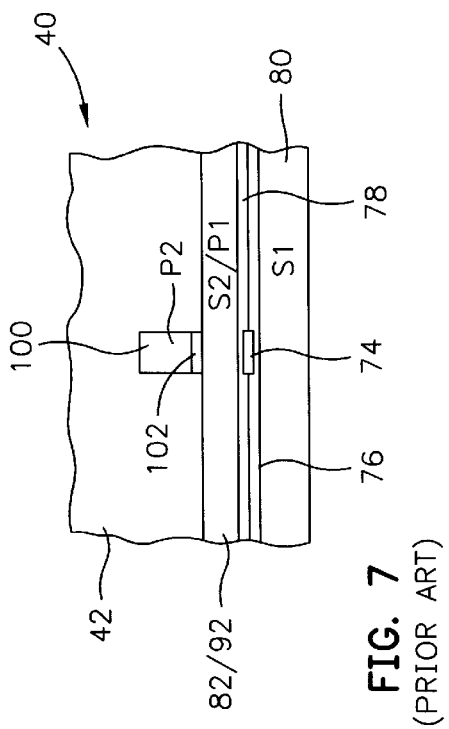
FIG. 7 is a partial ABS view of the slider taken along plane 7—7 of FIG. 6 to show the read and write elements of the magnetic head.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 8:
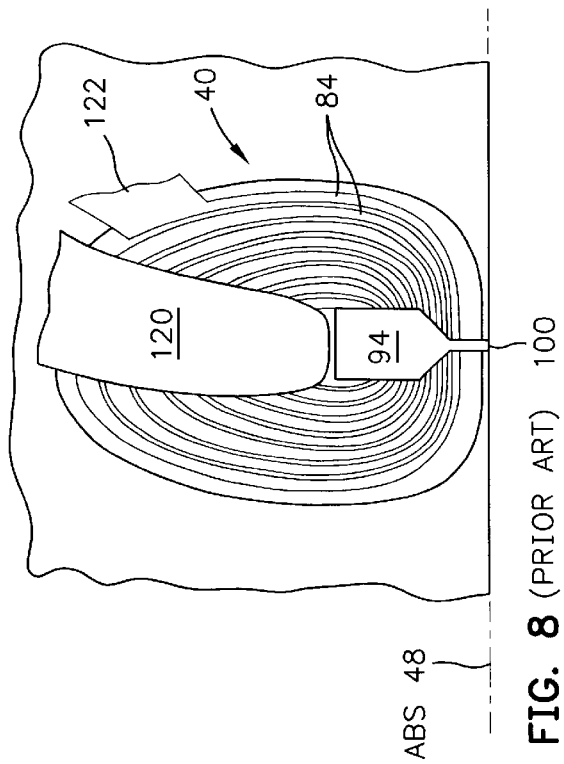
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
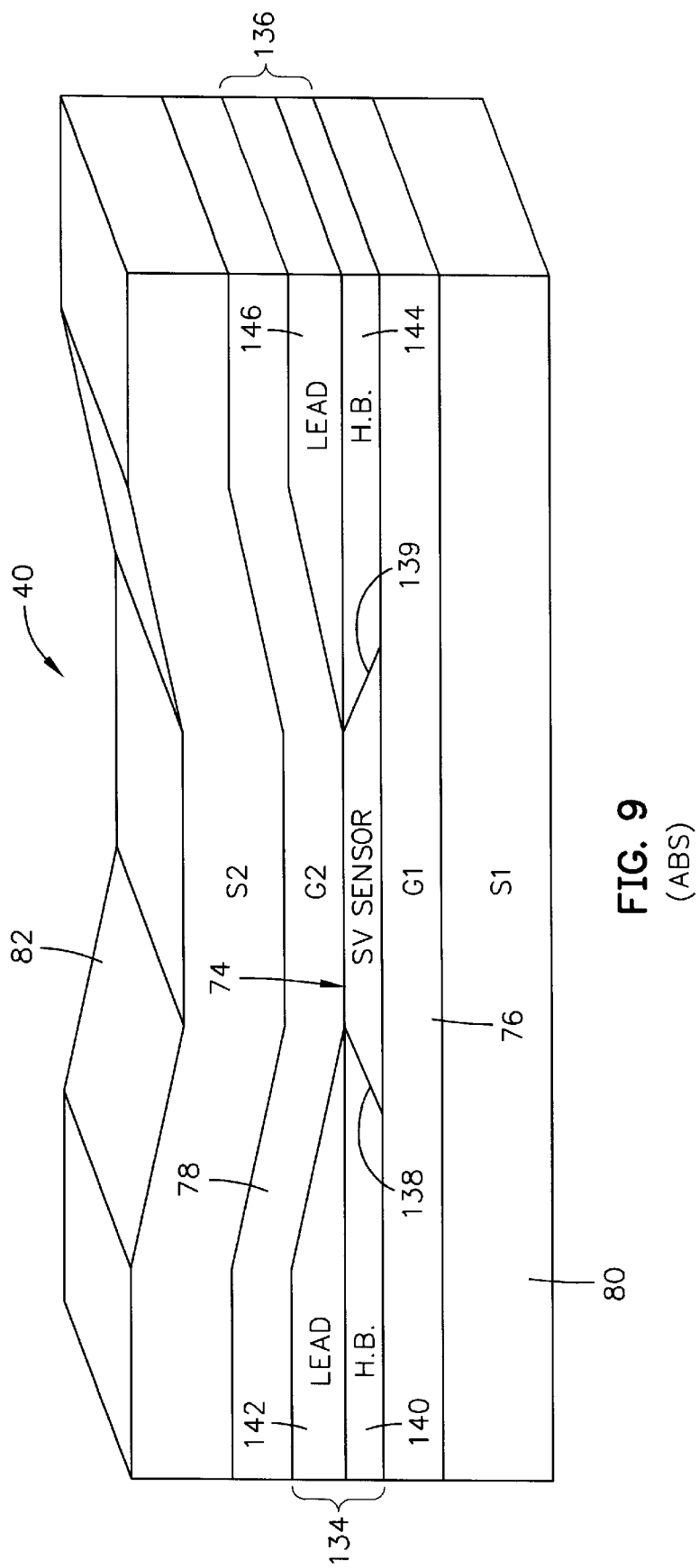
FIG. 9 is an enlarged isometric illustration of the read head with a spin valve sensor.

FIG. 9 is an enlarged isometric ABS illustration of the read head 40 shown in FIG. 6. The read head 40 includes the spin valve sensor 74. First and second hard bias and lead layers 134 and 136 are connected to first and second side surfaces 138 and 139 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

The Invention

Figure 10:
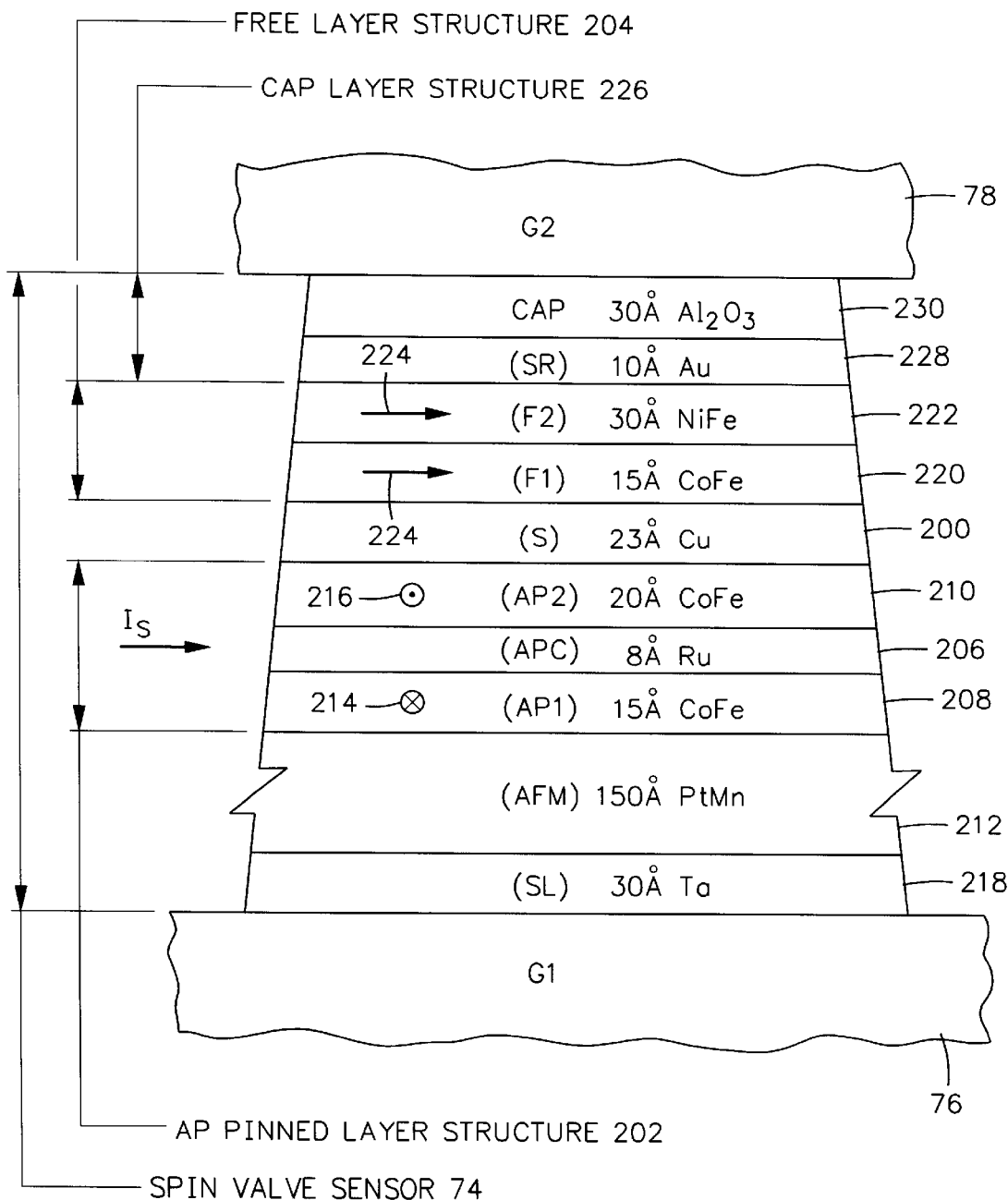
FIG. 10 is an enlarged isometric illustration of the present spin valve sensor.

FIG. 10 is an enlarged ABS illustration of the present spin valve sensor 74 which is located between the first and second read gap layers 76 and 78. The spin valve sensor includes a spacer layer (S) 200 which is located between an antiparallel (AP) pinned layer structure 202 and a free layer structure 204. The pinned layer structure 202 includes an antiparallel coupling (APC) layer 206 which is located between first and second antiparallel (AP) pinned layers (AP1) and (AP2) 208 and 210. The first AP pinned layer 208 interfaces and is exchange coupled to an antiferromagnetic (AFM) pinning layer 212 which pins a magnetic moment 214 of the first AP pinned layer perpendicular to the ABS in a direction out of the sensor or into the sensor, as shown in FIG. 10. By a strong antiparallel coupling between the first and second AP pinned layers 208 and 210 the second AP pinned layer has a magnetic moment 216 which is antiparallel to the magnetic moment 214. A seed layer (SL) 218 is provided as a base for the pinning layer 212 for promoting a desirable texture of the layers deposited thereon.

The free layer structure 204 includes first and second free layers (F1) and (F2) 220 and 222. The free layer structure 204 has a magnetic moment 224 which is parallel to the ABS and to the major planes of the layers in a direction from right to left or from left to right, as shown in FIG. 10. When a signal field from the rotating magnetic disk rotates the magnetic moment 224 of the free layer structure into the sensor, the magnetic moments 224 and 216 become more antiparallel which increases the resistance of the sensor to the sense current Is, and when the signal field from the rotating magnetic disk rotates the magnetic moment 224 out of the sensor, the magnetic moments 224 and 216 become more parallel which decreases the resistance of the sensor to the sense current. These resistance changes are processed as playback signals by the processing circuitry 50 in FIG. 3.

A cap layer structure 226 is located on the free layer structure 204 for reflecting conduction electrons back into the mean free path of conduction electrons and for protecting the sensor from subsequent processing steps. The cap layer structure 226 includes a specular reflector (SR) layer 228 which interfaces the second free layer 222 and a cap layer 230 which is located between the specular reflector layer 228 and the second read gap layer 78. In a preferred embodiment, the specular reflector layer 228 is gold (Au). In the past, this specular reflector layer 228 has been capped by tantalum (Ta) which degrades the performance of the gold specular reflector layer. In the present invention the cap layer 230 is preferably composed of alumina ($Al_2O_3$) which is compatible with gold and does not cause degradation. If the alumina cap layer 230 interfaced the nickel iron (NiFe) second free layer 222 it would cause oxidation of the second free layer. Accordingly, the gold specular reflector layer 228 isolates the alumina cap layer 230 from the nickel iron second free layer 222, as well as causing specular reflection of conduction electrons. The invention also includes copper for the metal first cap layer and tantalum oxide for the second cap layer.

Exemplary thicknesses and materials for the layers are 30 Å of tantalum for the seed layer 218, 150 Å of platinum manganese for the pinning layer 212, 15 Å of cobalt iron for the first AP pinned layer 208, 8 Å of ruthenium for the antiparallel coupling layer 206, 20 Å of cobalt iron for the second AP pinned layer 210, 23 Å of copper for the spacer layer 200, 15 Å of cobalt iron for the first free layer 220, 30 Å of nickel iron for the second free layer 222, 10 Å of gold for the specular reflector layer 228 and 30 Å of aluminum oxide for the cap layer 230.

Discussion

While the AP pinned layer structure 202 is preferred, it should be understood that a simple pinned layer structure, whether it is one or more ferromagnetic layers, may be employed. Further, it should be understood that while a single spin valve sensor is shown in FIG. 10, the cap layer structure may also be used in a dual spin valve sensor. Still further, the free layer structure 204 in FIG. 10 comprising a first free of cobalt iron and a second free layer of nickel iron is preferred for optimizing the magnetoresistive coefficient dr/R. However, it should be understood that other compositions may be employed for the free layer structure without departing from the spirit of the invention. The cobalt iron layers may be simply cobalt based, however, the preferred composition is cobalt iron ($Co_{90}Fe_{10}$). The preferred nickel iron is $Ni_{83}Fe_{17}$. Other pinning layers 222 may be employed, such as nickel manganese or iridium manganese. However, the preferred material for the pinning layer is platinum manganese ($Pt_{50}Mn_{50}$). It should be understood that the thicknesses of the materials are exemplary, however, the specular reflector layer 228 is preferably 10 Å or less so as to minimize sense current shunting.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
   a spin valve sensor including:
      a ferromagnetic pinned layer structure that has a magnetic moment;
      a pinning layer exchange coupled to the pinned layer structure for pinning the magnetic moment of the pinned layer structure;
      a ferromagnetic free layer structure;
      a nonmagnetic electrically conductive spacer layer located between the free layer structure and the pinned layer structure;
      a cap layer structure;
      the free layer structure being located between the spacer layer and the cap layer structure;
      the cap layer structure comprising first and second cap layers wherein the first cap layer is located between and interfaces each of the free layer structure and the second cap layer;
      the first cap layer being composed of gold for specular reflection; and
      the second cap layer being composed of aluminum oxide.

2. A magnetic read head as claimed in claim 1 including:
   nonmagnetic electrically nonconductive first and second read gap layers;
   the spin valve sensor being located between the first and second read gap layers;
   ferromagnetic first and second shield layers; and
   the first and second read gap layers being located between the first and second shield layers.

3. A magnetic read head as claimed in claim 2 including:
   the free layer structure including first and second free layers wherein the second free layer is located between and interfaces each of the first free layer and the first cap layer; and
   the first free layer being composed of cobalt iron (CoFe) and the second free layer being composed of nickel iron (NiFe).

4. A magnetic read head as claimed in claim 3 wherein the pinned layer structure is an antiparallel (AP) pinned layer structure that includes:
- ferromagnetic first and second antiparallel (AP) pinned layers with the first AP pinned layer interfacing the pinning layer and the second AP pinned layer interfacing the spacer layer; and
- an antiparallel (AP) coupling layer located between and interfacing the first and second AP pinned layers.

5. A magnetic head assembly having an air bearing surface (ABS), comprising:
- a write head including:
  - ferromagnetic first and second pole piece layers that have a yoke portion located between a pole tip portion and a back gap portion;
  - a nonmagnetic write gap layer located between the pole tip portions of the first and second pole piece layers;
  - an insulation stack with at least one coil layer embedded therein located between the yoke portions of the first and second pole piece layers; and
  - the first and second pole piece layers being connected at their back gap portions; and
- a read head including:
  - a spin valve sensor;
  - nonmagnetic electrically nonconductive first and second read gap layers;
  - the spin valve sensor being located between the first and second read gap layers;
  - a ferromagnetic first shield layer; and
  - the first and second gap layers being located between the first shield layer and the first pole piece layer; and
- the spin valve sensor including:
  - a ferromagnetic pinned layer structure that has a magnetic moment;
  - a pinning layer exchange coupled to the pinned layer structure for pinning the magnetic moment of the pinned layer structure;
  - a ferromagnetic free layer structure;
  - a nonmagnetic electrically conductive spacer layer located between the free layer structure and the pinned layer structure;
  - a cap layer structure;
  - the free layer structure being located between the spacer layer and the cap layer structure;
  - the cap layer structure comprising first and second cap layers wherein the first cap layer is located between and interfaces each of the free layer structure and the second cap layer;
  - the first cap layer being composed of gold for specular reflection; and
  - the second cap layer being composed of aluminum oxide.

6. A magnetic head assembly as claimed in claim 5, including:
- the free layer structure including first and second free layers wherein the second free layer is located between and interfaces each of the first free layer and the first cap layer; and
- the first free layer being composed of cobalt iron (CoFe) and the second free layer being composed of nickel iron (NiFe).

7. A magnetic head assembly as claimed in claim 6 wherein the pinned layer structure is an antiparallel (AP) pinned layer structure that includes:
- ferromagnetic first and second antiparallel (AP) pinned layers with the first AP pinned layer interfacing the pinning layer and the second AP pinned layer interfacing the spacer layer; and
- an antiparallel (AP) coupling layer located between and interfacing the first and second AP pinned layers.

8. A magnetic disk drive including at least one magnetic head assembly that has an air bearing surface (ABS) and that includes a write head and a read head, comprising:
- a write head including:
  - ferromagnetic first and second pole piece layers that have a yoke portion located between a pole tip portion and a back gap portion;
  - a nonmagnetic write gap layer located between the pole tip portions of the first and second pole piece layers;
  - an insulation stack with at least one coil layer embedded therein located between the yoke portions of the first and second pole piece layers; and
  - the first and second pole piece layers being connected at their back gap portions; and
- a read head including:
  - a spin valve sensor
  - nonmagnetic electrically nonconductive first and second read gap layers; the spin valve sensor being located between the first and second read gap layers;
  - a ferromagnetic first shield layer; and
  - the first and second read gap layers being located between the first shield layer and the first pole piece layer; and
- the spin valve sensor including:
  - a ferromagnetic pinned layer structure that has a magnetic moment;
  - a pinning layer exchange coupled to the pinned layer structure for pinning the magnetic moment of the pinned layer structure;
  - a ferromagnetic free layer structure;
  - a nonmagnetic electrically conductive spacer layer located between the free layer structure and the pinned layer structure;
  - a cap layer structure;
  - the free layer structure being located between the spacer layer and the cap layer structure;
  - the cap layer structure comprising first and second cap layers wherein the first cap layer is located between and interfaces each of the free layer structure and the second cap layer;
  - the first cap layer being composed of gold for specular reflection; and
  - the second cap layer being composed of aluminum oxide;
- a housing;
- a magnetic disk rotatably supported in the housing;
- a support mounted in the housing for supporting the magnetic head assembly with said ABS facing the magnetic disk so that the magnetic head assembly is in a transducing relationship with the magnetic disk;
- a spindle motor for rotating the magnetic disk;
- an actuator positioning means connected to the support for moving the magnetic head assembly to multiple positions with respect to said magnetic disk; and
- a processor connected to the magnetic head assembly, to the spindle motor and to the actuator for exchanging signals with the magnetic head assembly, for controlling movement of the magnetic disk and for controlling the position of the magnetic head assembly.

9. A magnetic disk drive as claimed in claim 8 including:
- the free layer structure including first and second free layers wherein the second free layer is located between and interfaces each of the first free layer and the first cap layer; and the first free layer being composed of cobalt iron (CoFe) and the second free layer being composed of nickel iron (NiFe).

10. A magnetic disk drive as claimed in claim 9 wherein the pinned layer structure is an antiparallel (AP) pinned layer structure that includes:

ferromagnetic first and second antiparallel (AP) pinned layers with the first AP pinned layer interfacing the pinning layer and the second AP pinned layer interfacing the spacer layer; and an antiparallel (AP) coupling layer located between and interfacing the first and second AP pinned layers.

11. A method of making a magnetic read head which has an air bearing surface (ABS), comprising the steps of:

a making a spin valve sensor comprising the steps of
forming a ferromagnetic pinned layer structure that has a magnetic moment;
forming a pinning layer exchange coupled to the pinned layer structure for pinning the magnetic moment of the pinned layer structure;
forming a ferromagnetic free layer structure;
forming a nonmagnetic electrically conductive spacer layer between the free layer structure and the pinned layer structure;
forming a cap layer structure with the free layer structure located between the spacer layer and the cap layer structure;
forming the cap layer structure with first and second cap layers wherein the first cap layer is located between and interfaces each of the free layer structure and the second cap layer;
forming the first cap layer of gold for specular reflection; and
forming the second cap layer of aluminum oxide.

12. A method as claimed in claim 11 including:

forming nonmagnetic electrically nonconductive first and second read gap layers;
forming the spin valve sensor between the first and second read gap layers;
forming ferromagnetic first and second shield layers; and
forming the first and second read gap layers between the first and second shield layers.

13. A method as claimed in claim 12 including:

the free layer structure being formed with first and second free layers wherein the second free layer is located between and interfaces each of the first free layer and the first cap layer; and the first free layer being formed of cobalt iron (CoFe) and the second free layer being formed of nickel iron (NiFe).

14. A method as claimed in claim 13 wherein a forming of the pinned layer structure comprises the steps of:

forming ferromagnetic first and second antiparallel (AP) pinned layers with the first AP layer interfacing the pinning layer; and forming an antiparallel (AP) coupling layer between the first and second AP pinned layers.

15. A method of making magnetic head assembly that has an air bearing surface (ABS), comprising the steps of:

making a write head including the steps of:
forming ferromagnetic first and second pole piece layers in pole tip, yoke and back gap regions wherein the yoke region is located between the pole tip and back gap regions;
forming a nonmagnetic electrically nonconductive write gap layer between the first and second pole piece layers in the pole tip region;
forming an insulation stack with at least one coil layer embedded therein between the first and second pole piece layers in the yoke region; and
connecting the first and pole piece layers at said back gap region; and making a read head including the steps of:
forming nonmagnetic electrically nonconductive first and second read gap layers;
forming a spin valve sensor between the first and second read gap layers;
forming the first and second read gap layers between the first shield layer and the first pole piece layer; and a making of the spin valve sensor comprising the steps of
forming a ferromagnetic pinned layer structure that has a magnetic moment;
forming a pinning layer exchange coupled to the pinned layer structure for pinning the magnetic moment of the pinned layer structure;
forming a ferromagnetic free layer structure;
forming a nonmagnetic electrically conductive spacer layer between the free layer structure and the pinned layer structure;
forming a cap layer structure with the free layer structure located between the spacer layer and the cap layer structure;
forming the cap layer structure with first and second cap layers wherein the first cap layer is located between and interfaces each of the free layer structure and the second cap layer;
forming the first cap layer of gold for specular reflection; and
forming the second cap layer of aluminum oxide.

16. A method as claimed in claim 15 including:

the free layer structure being formed with first and second free layers wherein the second free layer is located between and interfaces each of the first free layer and the first cap layer; and the first free layer being formed of cobalt iron (CoFe) and the second free layer being formed of nickel iron (NiFe).

17. A method as claimed in claim 16 wherein a forming of the pinned layer structure comprises the steps of:

forming ferromagnetic first and second antiparallel (AP) pinned layers with the first AP layer interfacing the pinning layer; and forming an antiparallel (AP) coupling layer between the first and second AP pinned layers.

* * * * *